(12) United States Patent
Bandic et al.

(10) Patent No.: US 7,416,991 B2
(45) Date of Patent: Aug. 26, 2008

(54) HIGH RESOLUTION PATTERNING OF SURFACE ENERGY UTILIZING HIGH RESOLUTION MONOMOLECULAR RESIST FOR FABRICATION OF PATTERNED MEDIA MASTERS

(75) Inventors: Zvonimir Z. Bandic, San Jose, CA (US); Bernhard E. Knigge, San Jose, CA (US); Charles Mathew Mate, San Jose, CA (US)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 148 days.

(21) Appl. No.: 11/433,019

(22) Filed: May 11, 2006

(65) Prior Publication Data

US 2007/0264833 A1 Nov. 15, 2007

(51) Int. Cl.
*H01L 21/302* (2006.01)
(52) U.S. Cl. .................. 438/717; 438/706; 438/725; 430/311; 430/312
(58) Field of Classification Search .................. 438/637, 438/706, 720, 717, 725; 430/311, 312, 314
See application file for complete search history.

(56) References Cited

U.S. PATENT DOCUMENTS

| | | | |
|---|---|---|---|
| 3,810,874 A | 5/1974 | Mitsch et al. ................ 260/75 |
| 4,671,999 A | 6/1987 | Burguette et al. ............ 428/422 |
| 4,751,171 A | 6/1988 | Ogawa ........................ 430/299 |
| 5,077,085 A | 12/1991 | Schnur et al. ................ 427/98 |
| 5,378,502 A | 1/1995 | Willard et al. ............... 427/305 |
| 5,468,597 A | 11/1995 | Calabrese et al. ............ 430/315 |
| 5,512,131 A | 4/1996 | Kumar et al. ............. 156/655.1 |
| 5,725,788 A | 3/1998 | Maracas et al. ............... 216/41 |
| 6,303,277 B1 | 10/2001 | Hieda et al. .................. 430/322 |
| 6,680,079 B1 | 1/2004 | Stirniman et al. ........... 427/130 |
| 6,822,833 B2 | 11/2004 | Yang et al. ................... 360/126 |
| 6,936,194 B2 * | 8/2005 | Watts ........................ 264/1.25 |
| 2002/0084429 A1 | 7/2002 | Craighead et al. ....... 250/492.22 |
| 2002/0182890 A1 | 12/2002 | Ishida et al. ................. 438/780 |
| 2004/0023152 A1 * | 2/2004 | Feiring et al. ............. 430/270.1 |
| 2004/0046271 A1 | 3/2004 | Watts ........................ 264/1.25 |
| 2004/0118809 A1 * | 6/2004 | Chou et al. .................... 216/40 |

(Continued)

OTHER PUBLICATIONS

F. Sun et al., "Ultrathin Self-Assembled Polymeric Films on Solid Surfaces. III. Influence of Acrylate Dithioalkyl Side Chain Length On Polymeric Monolayer Formation on Gold", Jul. 1994.

(Continued)

*Primary Examiner*—Lan Vinh
(74) *Attorney, Agent, or Firm*—Zilka-Kotab, PC

(57) ABSTRACT

A method for patterning and forming very small structures on a substrate such as a wafer. The process uses a difference in surface energy between a mask and the substrate to selectively deposit a hard mask material such as a metal onto the surface of the substrate. The mask can be formed extremely thin, such as only an atomic mono-layer thick, and can be patterned by ion beam photolithography. The pattern can, therefore, be formed with extremely high resolution. The thin mask layer can be constructed of various materials and can be constructed of perfluorpolyether diacrylate (PDA), which can be dip coated to and exposed to form a desirable positive photoresist mask layer.

18 Claims, 16 Drawing Sheets

U.S. PATENT DOCUMENTS

| | | | |
|---|---|---|---|
| 2004/0127019 A1* | 7/2004 | Konishi et al. | 438/637 |
| 2005/0069645 A1 | 3/2005 | Pesika et al. | 427/286 |
| 2006/0076046 A1* | 4/2006 | Ghoshal et al. | 136/205 |

OTHER PUBLICATIONS

H. Michel Biebuyck, "Self-Assembled Monolayers as High-Resolution Resist" IBM Technical Disclosure Bulletin, Apr. 1996.

C.K. Harnett et al., "Low-Energy Electron-Beam Patterning Of Amine-Functionalized Self-Assembled Monolayers" Applied Physics Letters, vol. 76, No. 17 p. 2466-2468, Apr. 24, 2000.

Sugimura et al., "Scanning Probe Lithography for Electrode Surface Modification" Journal of Electroanalytical Chemistry 473 (1999) 230-234.

Xia et al., "Pattern Transfer: Self-Assembled Monolayers as Ultrathin Resists" Microelectronic Engineering 32 (1996) 255-268.

Jeffrey M. Calvert, "Lithographic Patterning of Self-Assembled Films" J. Vac. Sci. Technol. B. 11(6), Nov./Dec. 1993.

* cited by examiner

HIGH RESOLUTION PATTERNING OF SURFACE ENERGY UTILIZING HIGH RESOLUTION MONOMOLECULAR RESIST FOR FABRICATION OF PATTERNED MEDIA MASTERS

FIELD OF THE INVENTION

The present invention relates to patterning of small features, and more particularly to high resolution patterning of features using a monomolecular, surface energy altering mask layer.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In current read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

Ever increasing data density and size requirements for devices such as disk drives and other electronic devices push researchers to continually find new ways of patterning ever smaller features with ever greater resolution. Current patterning techniques, such as those used to construct read and write elements in a magnetic head or to construct other features and devices are reaching their physical size and resolution limitations. One of the best techniques currently available is electron beam lithography. Typically, electron beam resists used for high resolution patterning (such as PMMA, KRS, ZEP, etc) are spin coated into a very thin layer and exposed in the e-beam tools. The process used following exposure and development of exposed resist (or unexposed in the case of negative contrast resist) requires significant thickness of the resist itself. For example, both lift-off and etching processes require thicknesses in excess of 100 nm. Resist thickness then becomes a serious limitation in a process in which very small features (for example 10 nm in size) need to be constructed, using 100 nm thick resist masks. The resolution of patterning such thick resist masks suffers from problems such as resist wall collapse, focus depth and other lithographic challenges, as well as creating undesirable high aspect ratio topographical structures.

A problem encountered by the data recording industry is that bit sizes are reaching a point where the recorded bits are becoming unstable. In currently available media, each bit contains a certain desired number of grains, such as about 100 to 500 grains. These grains are about 7 nm in diameter or so. In order for a bit to be recorded to the media, it is necessary that a large number of those individual grains all switch together (ie. are magnetized left, right, up or down) to have an acceptable signal to noise ratio. That means that as the size of the bit decreases, the size of the grains must decrease as well. As the bit size shrinks, those grains will become so small the media can become demagnetized (switched randomly) just at room temperature. Therefore, it would be desirable to find a way of constructing a magnetic media that can robustly record very small bits of data.

Therefore, there is a strong felt need for a process that can accurately pattern very small structures with a very high resolution. Such a process would preferably be capable of accurately patterning structures having a size of less than 100 nm, preferably smaller. There is also a strongly felt need for a process or structure for overcoming the size limitations of a recording media, to allow very small bits of data to be robustly recorded on a magnetic media.

SUMMARY OF THE INVENTION

The present invention provides a method for constructing very small structures on a substrate. The method involves forming an extremely thin mask structure over a substrate. The mask structure has a surface energy that is different than the surface energy of the substrate. A hard mask material is then deposited so that it adheres to the substrate, but not to the mask, because of the difference in surface energies between the mask layer and substrate.

For example, the mask can have a surface energy that is less than that of the substrate. The hard mask layer can then be deposited, for example, by electroless plating of a metal such as Cu. This metal can then adhere to the substrate based on the higher surface energy of the substrate, while not adhering to the mask layer because of the lower surface energy of the mask layer.

The mask layer can be constructed of perfluropolyether diacrylate (PDA), which has not previously been used as a mask layer. It has been found that this PDA material has the advantageous and unexpected property that it can be used to form a positive contrast e-beam resist mask having a very small thickness, down to one monolayer.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
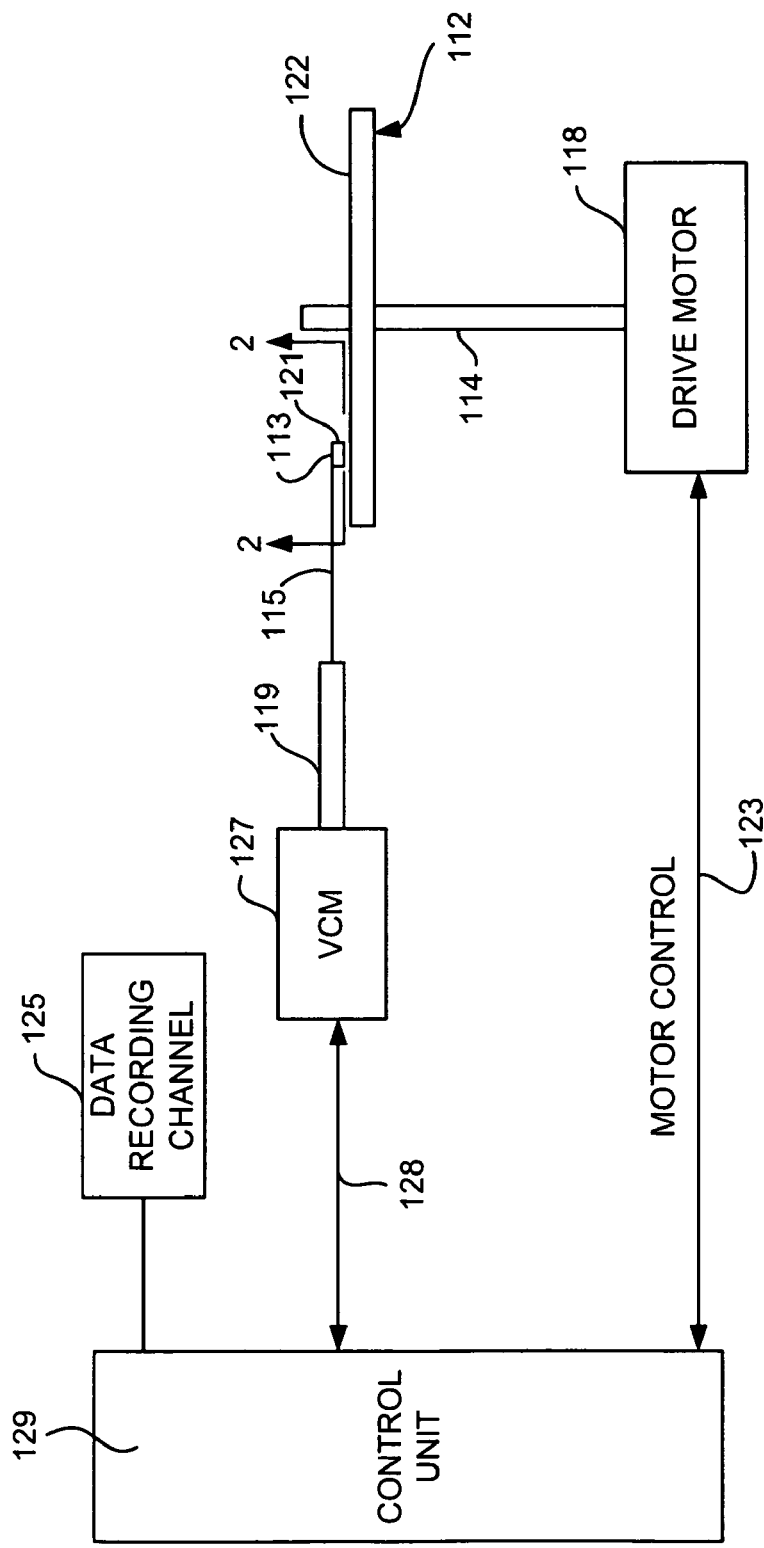
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
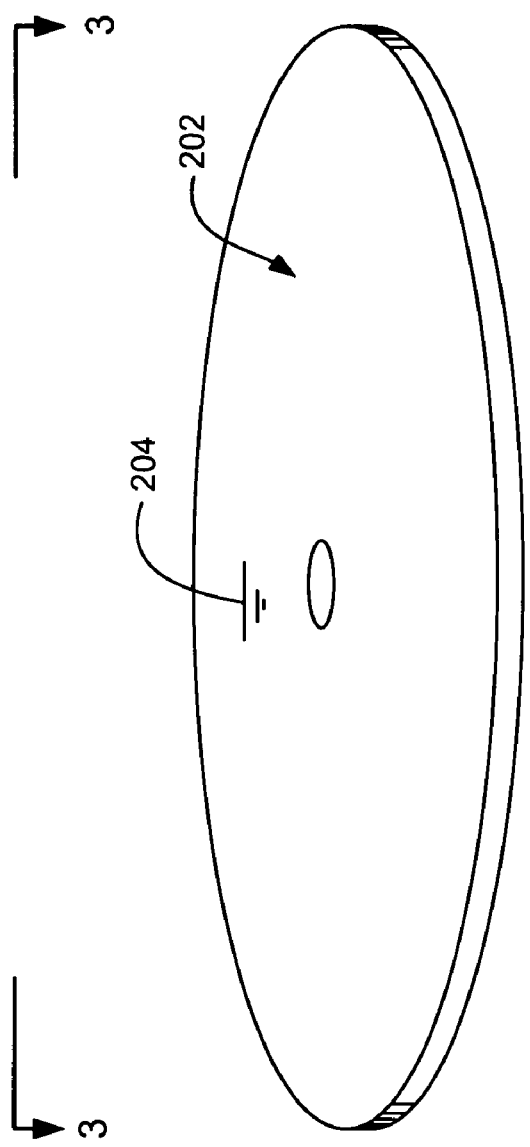
FIG. 2 is an isometric view of a magnetic disk for use in a disk drive system.

With reference to FIG. 2, a magnetic disk 121 according to an embodiment of the invention is illustrated. It should be pointed out that the patterned magnetic disk described with reference to FIG. 2 is described for the purpose illustrating an implementation of a novel patterning process for patterning very small features at very high resolution, and is by way of example. The novel patterning process that will be described below with reference to this and other figures can be used to pattern structures and features in any number of other devices for use in magnetic recording systems or in many other electronic devices.

Figure 3:
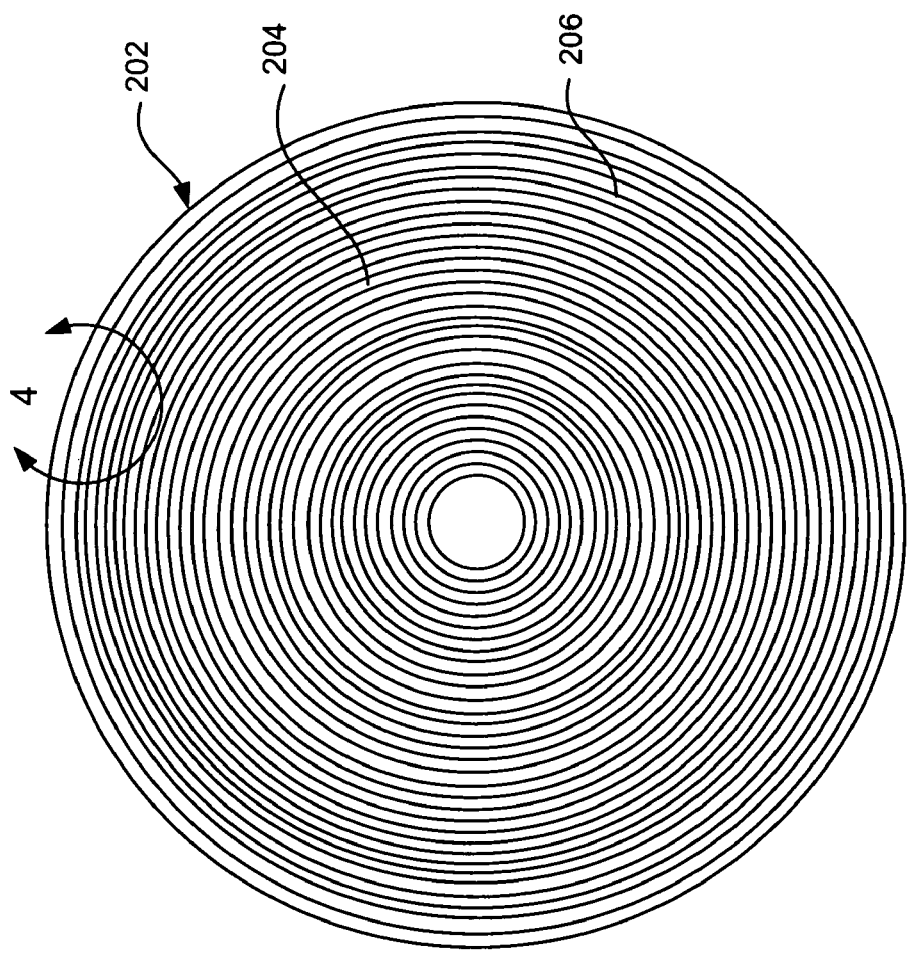
FIG. 3 is a view of the magnetic disk taken from line 3-3 of FIG. 2.
Figure 4A:
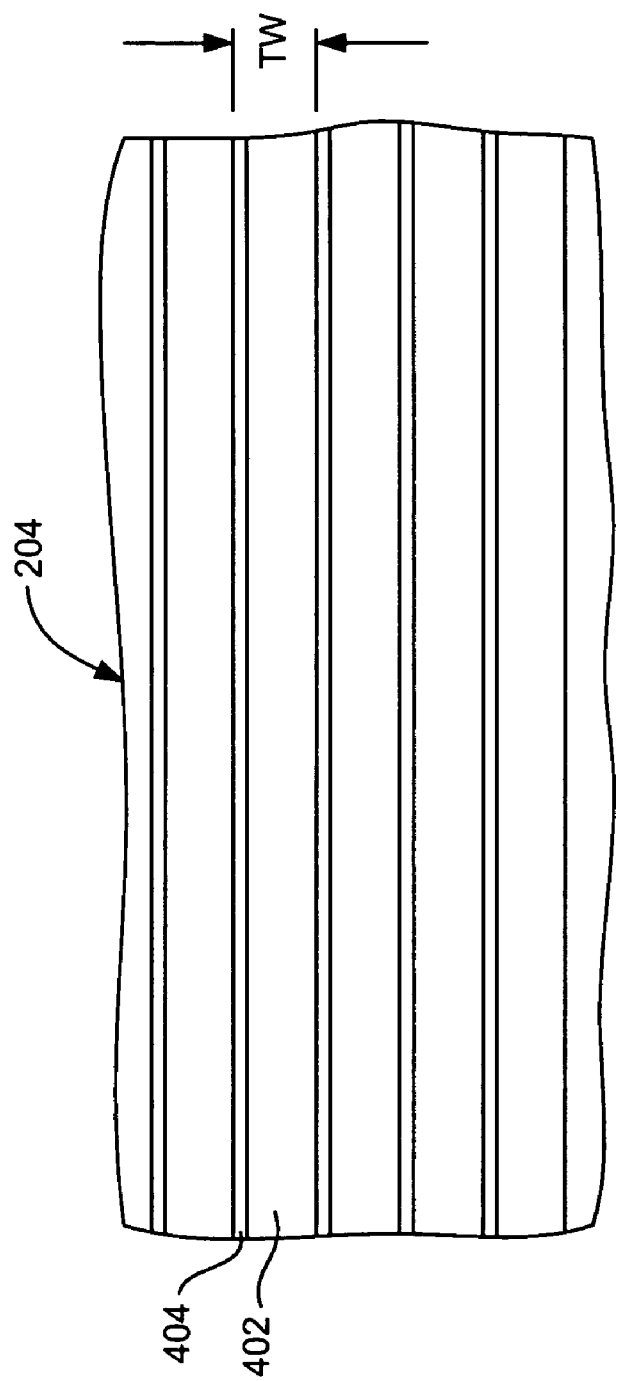
FIG. 4A is an enlarged view of the disk taken from circle 4 of FIG. 3 showing a patterned track media.

With this in mind, FIG. 2, shows a magnetic disk 202 for use in a magnetic disk drive device that has a magnetic surface 204 that avoids adjacent track interference and adjacent track writing. With reference to FIG. 3, the surface 204 can be seen to have concentric rings 206 of magnetic material, each of which can define a track of data. This can be seen more clearly with reference to FIG. 4, which shows a portion of the surface 204 of the disk 202 enlarged and in greater detail. As can be seen in FIG. 4, the disk has magnetic track portions 402 separated by thinner non-magnetic gaps 404. The magnetic track portions 402, therefore, have a width that defines a track width (TW). The magnetic portions 404 may include a material such as NiFe, CoFe, etc. The non-magnetic portion may include a material such as alumina ($Al_2O_3$) $Si_3N_4$, $Si(ON)_x$, etc. or may simply be an air gap, where the magnetic material in the portion 404 is recessed relative to the track portion 402.

Figure 4B:
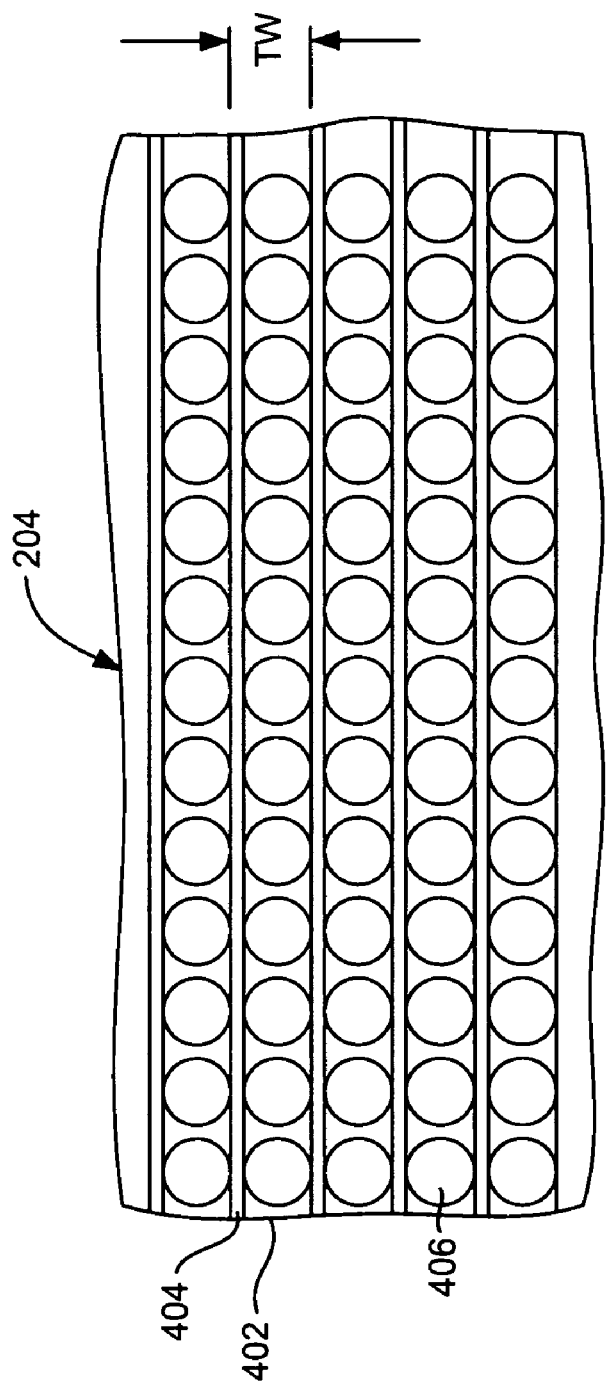
FIG. 4B is an enlarged view of the disk taken from circle 4 of FIG. 3 showing a patterned bit media.

As discussed in the Background of the Invention, data bits are becoming so small that the small grains required to record such bits are becoming magnetically unstable. This causes such very small bits of data to randomly switch at room temperature. One way to overcome this is to construct the media as a patterned bit media. With reference to FIG. 4B, in a patterned bit media, each bit of information is an individual magnetic island 406 rather than a group of hundreds of grains. Each bit island could be about 15-25 nm in diameter, which is large enough to be thermally stable, and small enough when packed to provide a large real density of bits. The present invention provides a process for constructing such a densely packed patterned media. This method is described below, however, it should be understood that the below described process is not limited to constructing patterned media and could be used to construct any number of structures requiring high resolution and very small size.

Figure 5:
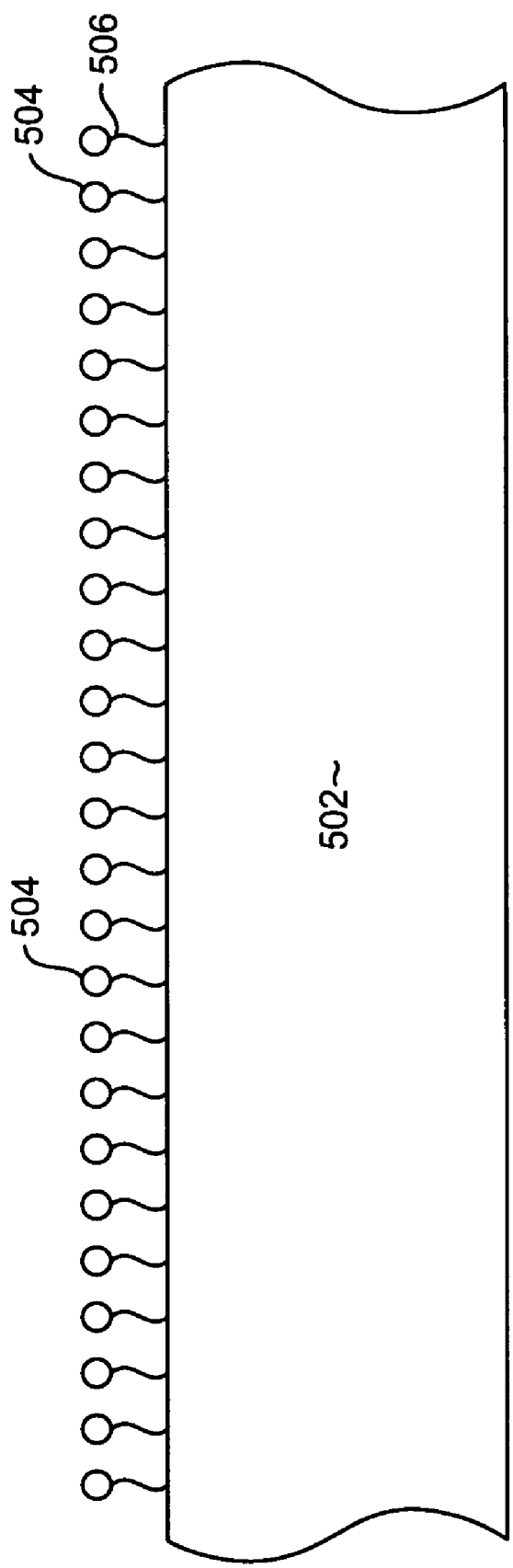
FIGS. 5-12 are side cross sectional views illustrating a method of forming a patterned structure on a wafer.

With reference now to FIG. 5, a method for patterning a surface having high resolution at very small size is described. This can be used to pattern the disk 202 (with patterned tracks and/or bits) described above with reference to FIGS. 4A and 4B, or as mentioned above, could be used to pattern some other structure for some other device. A substrate 502 is provided, which can be of various materials. For example, the substrate could be titanium carbide (TiC), alumina ($Al_2O_3$), silicon ($SiO_2$), indium titanium oxide (ITO) if a conductive surface is needed, etc. Then, a layer of very thin masking material 504 is deposited over the substrate 502. This masking material 504 is preferably deposited as a monomolecular layer or nearly so. This mask material 504 may be a material known as PDA, as will be discussed further herein below. The masking material 504 is preferably an electron beam sensitive material, which can adhere to the surface of the substrate 502. This adhesion is indicated by the squiggly lines 506 connecting the atoms of mask material 504 with the surface of the substrate 502. Typically, layers with a thickness on the order of 1 nm or less would qualify as monomolecular. This layer 504 may be applied by self-assembly, by spin-coating, dip-coating etc., but the properties of the molecules themselves allow creation of a uniform and very thin monomolecular layer.

Figure 6:
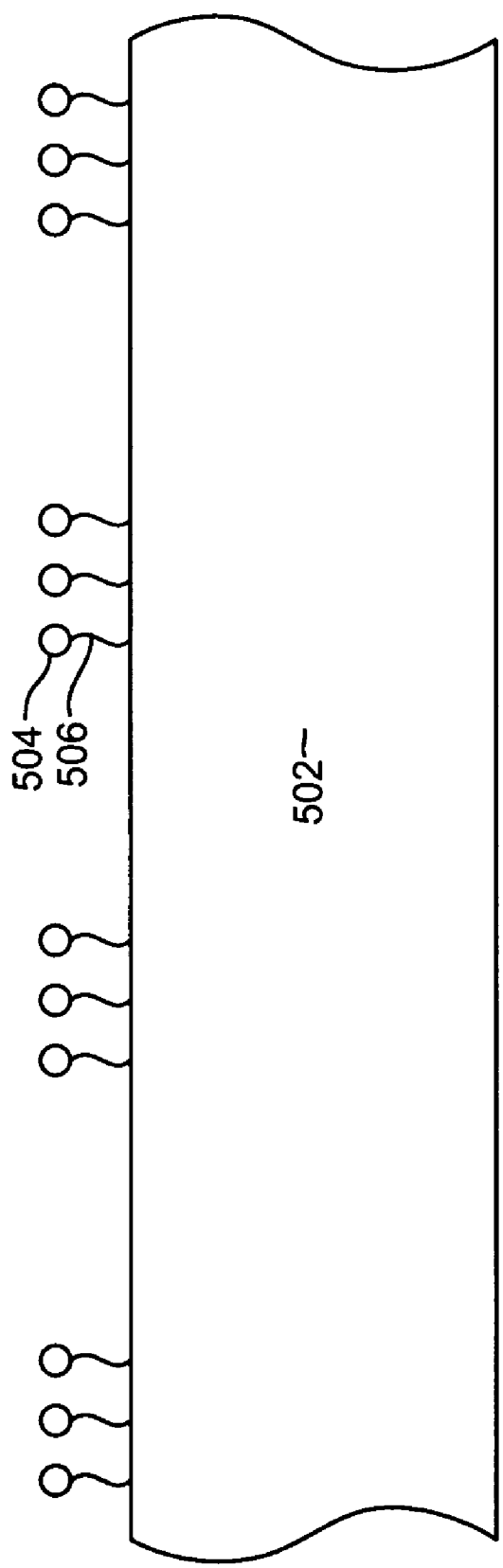

With reference now to FIG. 6, after applying this monomolecular layer (and stabilizing with heat treatment if required) this monomolecular layer is patterned by electron beam (e-beam) patterning in an electron beam tool, developed using an appropriate developing solution. If the mask structure 504 is constructed of PDA, a good developer solution is VERTREL® sold by 3M corp.®. This results in the novel mask structure 504 shown in FIG. 6.

This novel mask structure 504 provides at least a couple of significant advantages. First, the thickness of the mask layer 504 provides no limitation to the e-beam resolution and e-beam patterning precision. And, secondly, following the development process, the exposed (or un-exposed for negative contrast mask) portions of the monomolecular mask layer 504 are removed, creating a flat surface on which to pattern a structure, as will be understood more clearly upon further reading of this description of the invention.

The surface of the substrate 502 is to be patterned by a difference in surface energy. This means that the surface energies of the monomolecular layer 504 and the substrate 502 are different. This requirement for contrasting surface energies can be met, for example, by most oxide/nitride/metal surfaces and a monomolecular layer based on fluorine chemistries. Although the invention is by no means limited to masks 504 having fluorine chemistries.

Figure 7A:
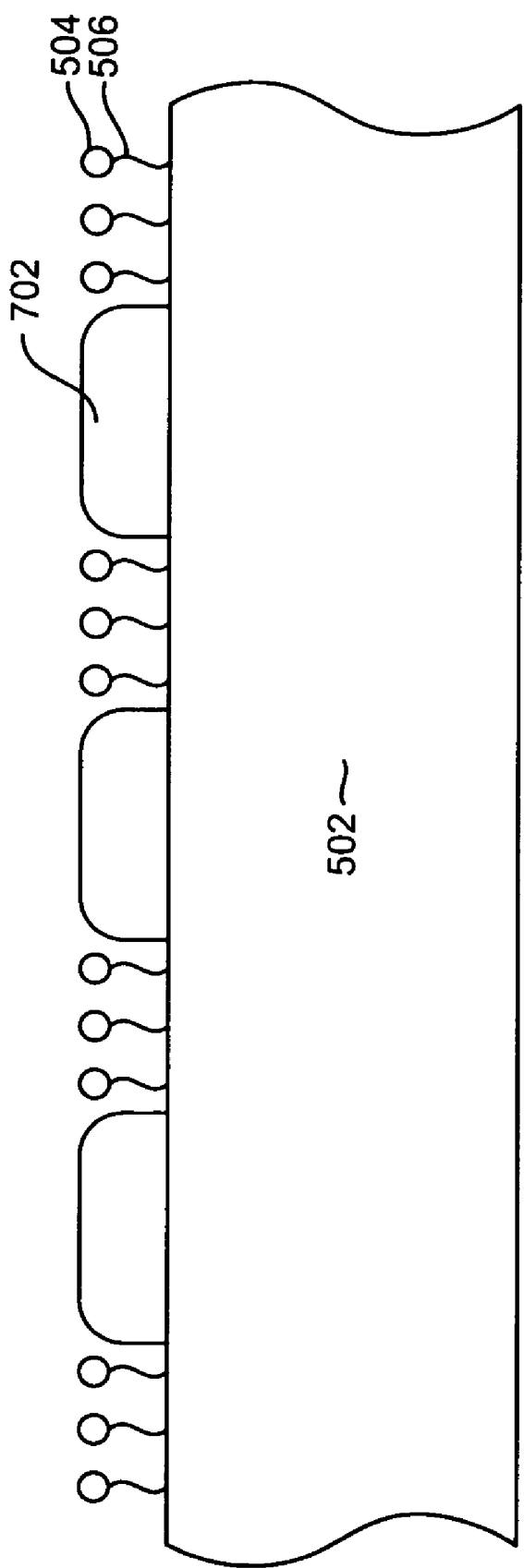
Figure 7B:
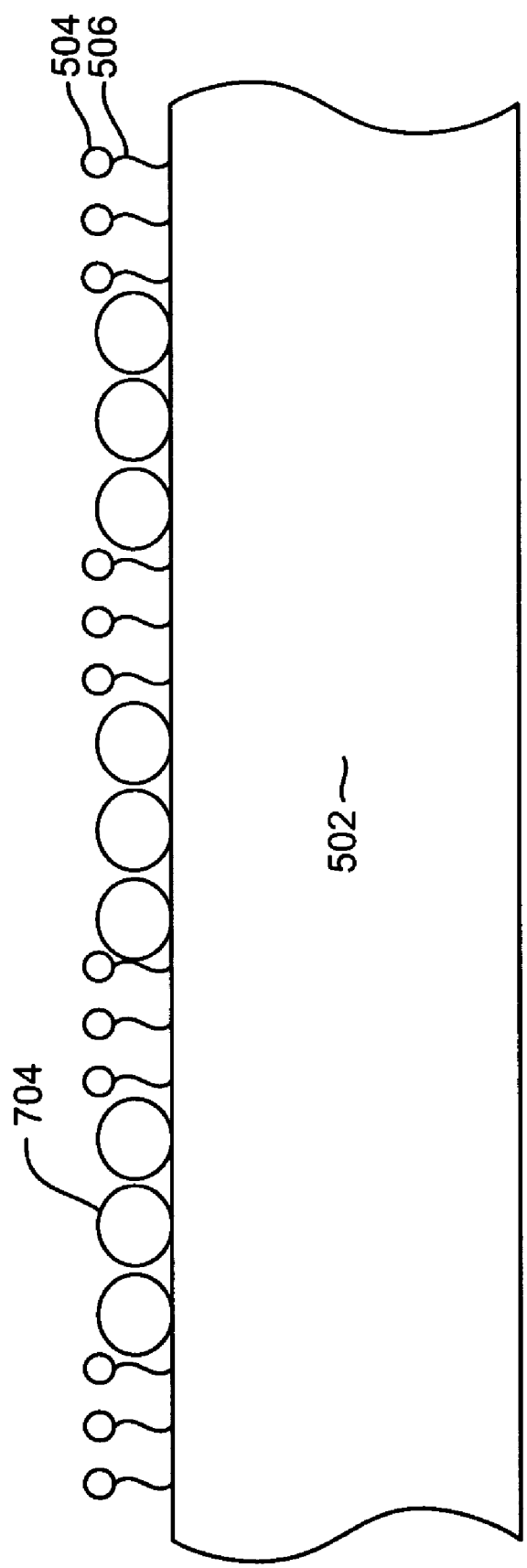

With reference now to FIG. 7A, with the monomolecular mask 504 patterned, a layer of hard mask material 702 is deposited. The hard mask 702 can be a metal, such as Cu, NiP, etc. This metal layer 702 can be deposited by various deposition techniques, such as electroless plating, electroplating, etc. The metal mask material is preferably deposited by electroless plating techniques. An example of a plating solution for electroless plating would be a liquid (such as water, $H_2O$) having very different wetting properties for the substrate surface 502 and the monomolecular layer oxide/nitride/metal surfaces 504, while at the same time prohibiting (or slowing down) plating on the low-energy surface, such as the surface of a fluorine based pattern transfer process, and since the surface of the substrate is flat, any geometrical concerns that would typically be experienced in an electroplating processes are eliminated. The plated pattern 702, such as Cu, electroless plated material, or NiP electroless plated material can then be used as a nanoimprinting master directly, or this metal pattern may be transferred into the substrate surface using dry or wet etching process techniques as will be described herein below. With reference to FIG. 7B, a mask structure can be formed by initiating self assembly of particles 704. Such particles could be, for example polystyrene spherical particles of uniform diameter. The particles 704 will assemble only in the openings in the mask 504, where the substrate 502 is exposed.

Figure 8A:
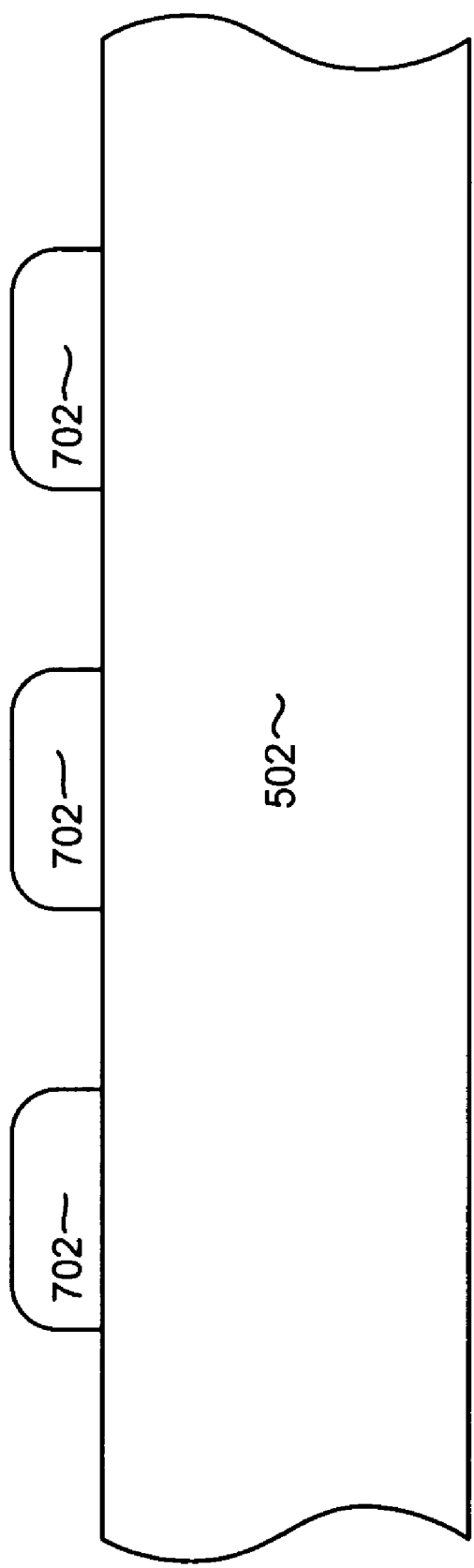
Figure 8B:
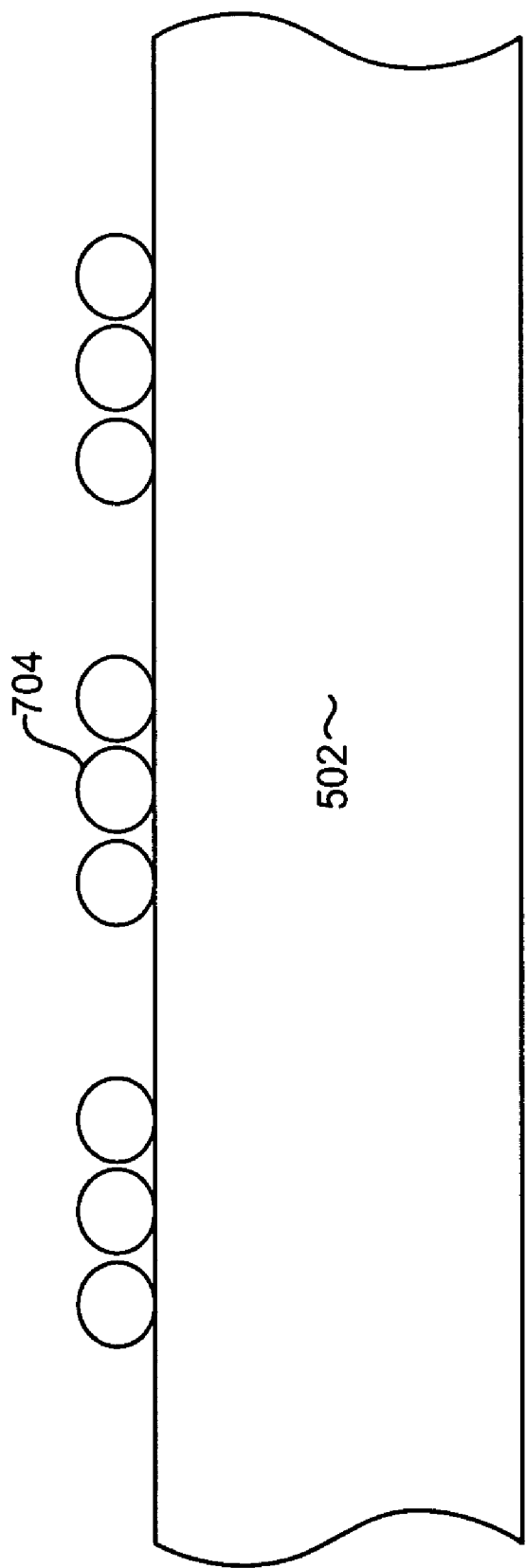

With reference now to FIG. 8A, the remaining monomolecular mask layer 504 can be lifted off. This can be accomplished by a chemical lift off process. Since the monomolecular layer is extremely thin, this lift off can be omitted if desired. At this point, the substrate 502 with a plated pattern of metal structures 702 (or self assembled particles as in FIG. 8B) can be used as a nonoimprinting master for imprinting a pattern image onto a workpiece. The workpiece (not shown) can first be covered with a resist. The workpiece may be a substrate of a magnetic disk, which may or may not be coated with a magnetic film. The master can then be pressed against the workpiece under high force and temperature, or by applying force and ultraviolet light, in the case of photonanoimprinting. Alternatively, the pattern of the metal features can be transferred into the substrate as will be described below.

Figure 9A:
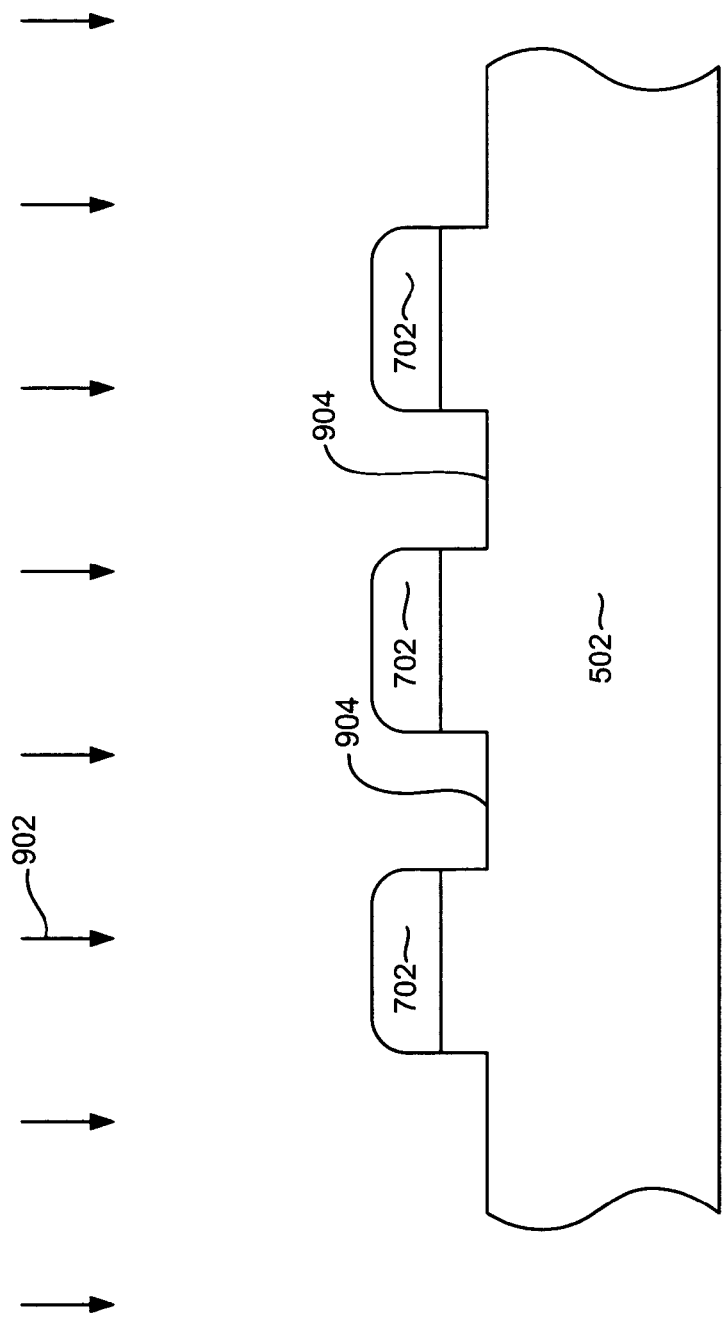
Figure 9B:
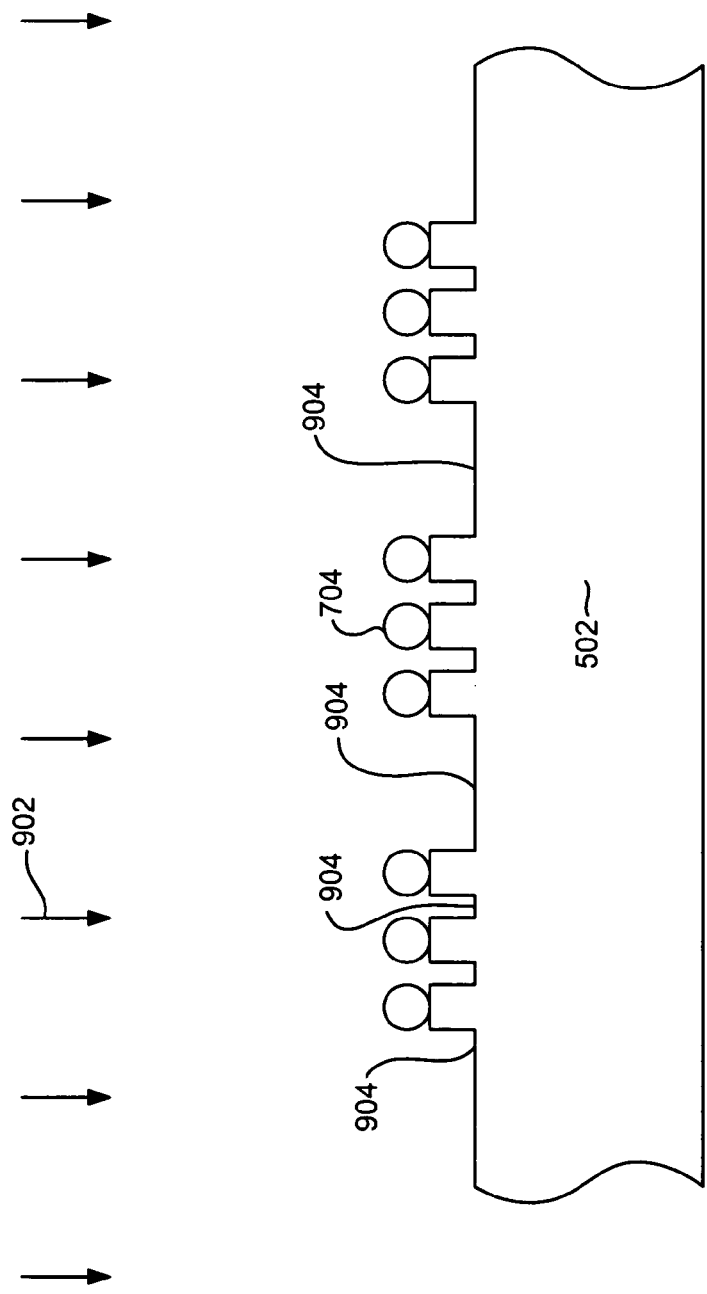

With reference now to FIG. 9A, a material removal process 904 such as, wet or dry etching techniques, reactive ion etching (RIE), reactive ion milling (RIM), or ion milling can be used to remove portions of the substrate 502 that are not covered by the metal mask layers 702 (or particles 704 as in FIG. 9B), thereby transferring the image of the mask 702 (or 704) into the substrate 502. This forms recesses or trenches 904 in the substrate 502. The choice of what process to use for the material removal process 902 depends upon the material used for the substrate 502 and upon what material is used for the mask 702 or 704.

Figure 10:
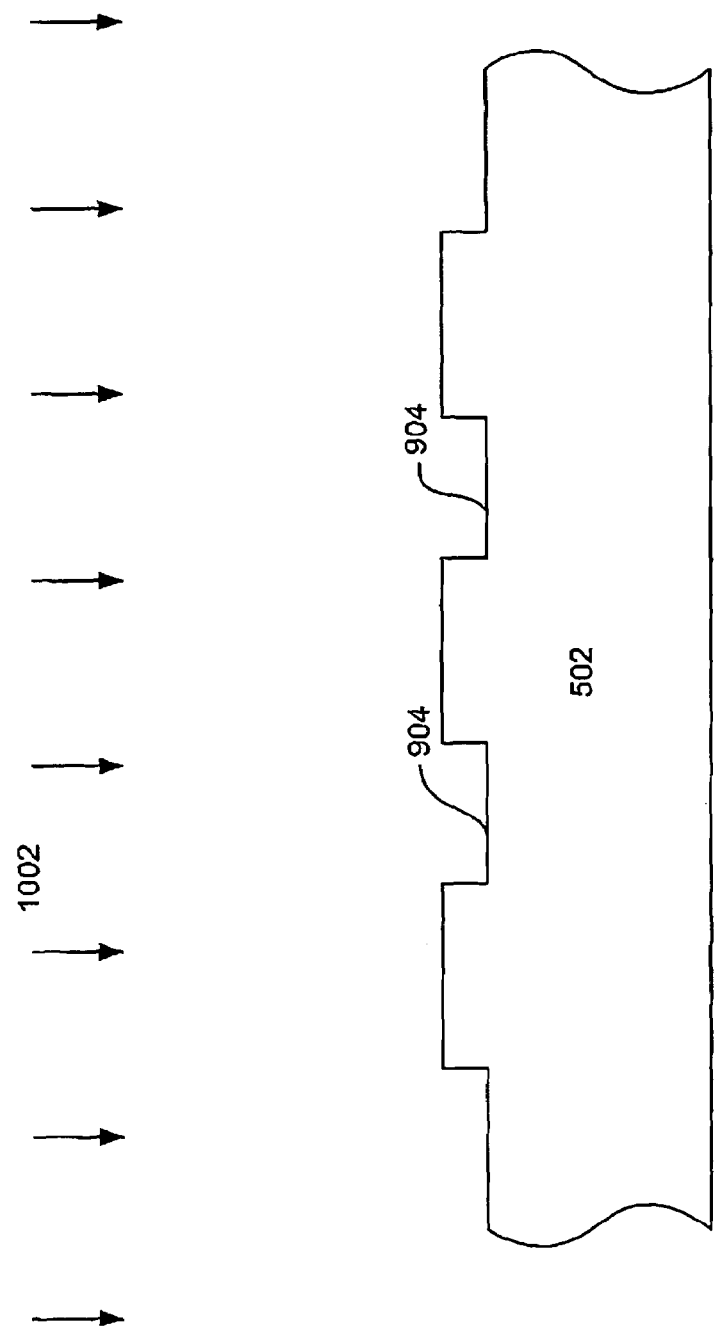
Figure 11:
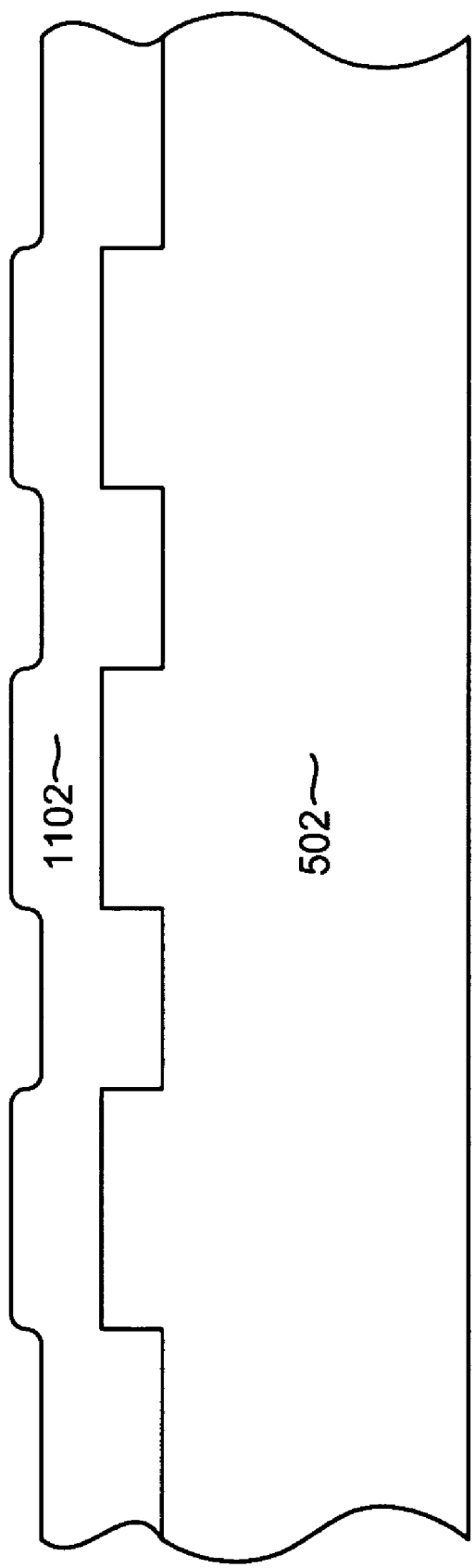
Figure 12:
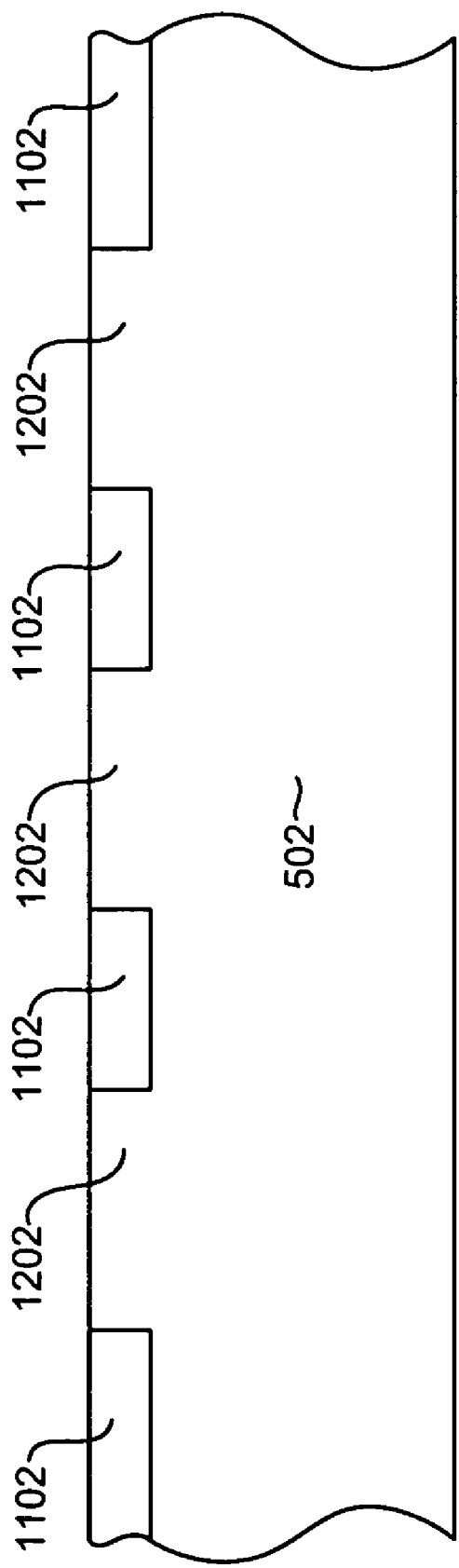

With reference now to FIG. 10, after a desired amount of substrate material 502 has been removed, the remaining metal mask material 702 can be removed. This material layer 702 can be removed, for example, by a reactive ion etch (RIE) 1002, which can be performed in a chemistry that is chosen to preferentially remove the metal material 702 or more preferably by wet etching. The resulting structure can be used as a nonoimprinting master, as described above. Or, the structure can be used for many other purposes. For example, when used to construct magnetic disk 202 as described in FIGS. 2-4 having magnetic ring portions 402 separated by non-magnetic gaps 404, at least a couple of possible constructions are possible. For example with reference to FIG. 11, after etching the substrate 502 to form the recesses 904, a layer of magnetic material 1102 can be deposited full film. Then, with reference to FIG. 12 a chemical mechanical polish (CMP) can be performed to planarize the magnetic layer and expose the raised portions of the substrate 502. This results in magnetic track portions 1102 separated by non-magnetic gap portions 1202.

With reference again to FIGS. 5-7, an excellent material for use in forming the thin monomolecular mask 504 is a material such as perfluorpolyether diacrylate, also known as PDA lubricant. This material is commercially available from 3M Company as L-9367®. This material has typically been used as a cured-in-place elastomeric compound, but has not been used as a mask. The formula for this material is, $$CH_2=CHCOOCH_2CF_2O(CFO)$$
$$NCF_2CH_2OCOCH=C_2,$$

where m/n=(0.7+−0.2) %. It should be understood that many other materials could be used for this invention provided that they provide for a difference in surface energy following exposure to an e-beam and a developer.

This material (PDA) can be applied as a dip coating, for example, using a solution of PDA (1 g/liter) in hydrofluoreether (HFE) solvent. The solution can then be applied on a wafer 502 that can be $SIN_x/Si$, by dip-coating, using a pullout velocity 8 nm/s (input velocity being 8 mm/sec as well, and time-in-solution applied of 4 sec). The wafer 502 and mask layer 504 can then be exposed using electron beam lithography, using charge doses of between 900 and 5000 uC/cm$^2$ or more preferably 1000-1200 uC/cm$^2$. The mask 504 can then be developed using a developer such as VERTREL XF® solvent for a duration of about 5 seconds and then blown dry using dry nitrogen.

When PDA is used as cured-in-place elastomeric compound, exposure to UV light crosslinks the acrylate end groups making it less soluble in most solvents. Consequently, it was expected that the PDA material would chemically link when exposed, and act as a negative photoresist. However, this PDA material provided the unexpected and advantageous result that it acted as a positive resist layer when exposed by electron beam lithography. A positive resist is preferable to a negative resist in most applications, because of its ability to form higher resolution structures. This material (PDA) also provides that distinct advantage of being able to form a very thin, essentially monomolecular, mask structure 504 as described above.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for forming very small structures on a wafer, the method comprising:
   providing a substrate;
   depositing a thin mask layer over the substrate;
   photolithographically patterning and developing the thin mask layer to remove selected portions of the mask layer from the substrate while leaving other portions of the substrate covered with the mask layer;
   depositing a hard mask material onto the substrate such that the hard mask material adheres to uncovered portions of the substrate and not to covered portions of the substrate; and
   after depositing the hard mask, removing the remaining thin mask layer, and then performing a material removal process to remove portions of the substrate that are not covered by the hard mask layer.

2. A method as in claim 1 wherein the hard mask is a metal.

3. A method as in claim 1 wherein the depositing a hard mask comprises electroless plating of a metal.

4. A method as in claim 1 wherein the depositing a hard mask comprises electroless deposition of Cu.

5. A method as in claim 1 wherein the thin mask layer is a monomolecular mask layer.

6. A method as in claim 1 wherein the thin mask is a monomolecular layer of material having a surface energy that is different from a surface energy of the substrate.

7. A method as in claim 1, wherein the thin mask layer comprises perfluoropolyether diacrylate.

8. A method as in claim 1 further comprising after depositing the hard mask and removing the remaining thin mask layer, using the substrate as a nanoimprinting master to form a pattern on a workpiece.

9. A method as in claim 1 further comprising after depositing the hard mask and removing the remaining thin mask layer, pressing the substrate against a workpiece to form a pattern on the workpiece.

10. A method as in claim 1 further comprising, after
   performing a material removal process to remove portions of the substrate that are not protected by the hard mask layer;
   using the workpiece as a nanoimprinting master to form a pattern on a workpiece.

11. A method as in claim 1 further comprising, after
   performing a material removal process to remove portions of the substrate that are not protected by the hard mask layer;
   pressing the substrate against a workpiece to form a pattern on the workpiece.

12. A method as in claim 1 further comprising, after
   performing a material removal process to remove portions of the substrate that are not protected by the hard mask layer;
   removing the hard mask; and
   using the workpiece as a nanoimprinting master to form a pattern on a workpiece.

13. A method as in claim 1 further comprising, after depositing the hard mask, removing the remaining thin mask layer, and then performing a reactive ion etch (RIE) to remove portions of the substrate that are not covered by the hard mask layer.

14. A method for forming a pattern on a substrate, comprising:
   providing a substrate, the substrate having a first surface energy;
   forming a mask over the substrate, the mask having a second surface energy that is lower than the first surface energy, the mask being configured to cover selected portions of the substrate while leaving other portions exposed;
   depositing a metal, the metal adhering to the exposed portions of the substrate due to the higher first surface energy of the substrate; and
   removing the mask.

15. A method as in claim 14 further comprising performing an ion mill to remove portions of the substrate that are not covered by the metal.

16. A method as in claim 14 further comprising performing an ion mill to remove portions of the substrate that are not covered by the metal and then performing a reactive ion etch to remove the metal.

17. A method as in claim 14, wherein the mask is a mono layer.

18. A method as in claim 14, wherein the forming a mask further comprises:
   depositing a monolayer of perfluoropolyether diacrylate;
   exposing the monolayer of perfluoropolyether dicrylate using electron beam photolithography; and
   developing the monolayer of perfluoropolyether diacrylate.

* * * * *